US012282133B2

(12) United States Patent
Li et al.

(10) Patent No.: US 12,282,133 B2
(45) Date of Patent: Apr. 22, 2025

(54) METHOD AND SYSTEM FOR GENERATING LOGARITHMIC NON-UNIFORM PSEUDO-RANDOM ELECTROMAGNETIC EXPLORATION SIGNAL

(71) Applicants: SHANDONG UNIVERSITY, Shandong (CN); THE CHINESE UNIVERSITY OF HONG KONG, SHENZHEN, Guangdong (CN)

(72) Inventors: Shucai Li, Jinan (CN); Yang Yang, Jinan (CN); Jishan He, Jinan (CN); Diquan Li, Jinan (CN); Jingbo Weng, Jinan (CN); Huaifeng Sun, Jinan (CN)

(73) Assignees: SHANDONG UNIVERSITY, Jinan (CN); THE CHINESE UNIVERSITY OF HONG KONG, SHENZHEN, Shenzhen (CN)

( * ) Notice: Subject to any disclaimer, the term of this patent is extended or adjusted under 35 U.S.C. 154(b) by 789 days.

(21) Appl. No.: 17/603,442

(22) PCT Filed: Mar. 30, 2021

(86) PCT No.: PCT/CN2021/083728
§ 371 (c)(1),
(2) Date: Oct. 13, 2021

(87) PCT Pub. No.: WO2021/218525
PCT Pub. Date: Nov. 4, 2021

(65) Prior Publication Data
US 2022/0308249 A1 Sep. 29, 2022

(30) Foreign Application Priority Data
Apr. 27, 2020 (CN) .......................... 202010344576.5

(51) Int. Cl.
*G01V 3/08* (2006.01)

(52) U.S. Cl.
CPC .................................... *G01V 3/083* (2013.01)

(58) Field of Classification Search
CPC ........................................................ G01V 3/083
See application file for complete search history.

(56) References Cited

U.S. PATENT DOCUMENTS

2007/0177705 A1* 8/2007 Lu .......................... G01V 3/083
375/377

FOREIGN PATENT DOCUMENTS

| CN | 1325031 A | 12/2001 |
|----|-----------|---------|
| CN | 102721982 A * | 10/2012 |

(Continued)

OTHER PUBLICATIONS

A. Y. F. Hu et al., Application of pseudo-random frequency domain electromagnetic method in mining areas with strong interferences, Elsevier, Mar. 2020 (Year: 2020).*

(Continued)

*Primary Examiner* — Giovanni Astacio-Oquendo
*Assistant Examiner* — Dilara Sultana
(74) *Attorney, Agent, or Firm* — Oliff PLC

(57) ABSTRACT

A method and system for generating a logarithmic non-uniform pseudo-random electromagnetic exploration signal including: constructing two or more basic unit signals, according to an exploration requirement, that are stairstep signals obtained by superposing in-phase periodic square wave signals, a frequency ratio between adjacent periodic square wave signals is 2, and the two or more basic unit signals meet the following requirement: if a lowest dominant frequency in a first basic unit signal is a fundamental frequency, lowest frequencies of the remaining basic unit signal are $l \times 2^m$ times the fundamental frequency, where l is an odd number except 1, and m is a natural number; and superposing the two or more basic unit signals to obtain a (Continued)

logarithmic non-uniform $2^n$ sequence pseudo-random signal. A logarithmic non-uniform $2^n$ sequence stairstep signal is constructed within a limited frequency interval, and requirements of prospectors for a higher frequency density within a specific frequency interval are met.

12 Claims, 11 Drawing Sheets

(56) References Cited

FOREIGN PATENT DOCUMENTS

| CN | 102780492 A | | 11/2012 |
|---|---|---|---|
| CN | 105866844 A | | 8/2016 |
| CN | 105974487 A | * | 9/2016 |
| CN | 109005005 A | | 12/2018 |
| CN | 111505722 A | | 8/2020 |
| JP | 2019-184248 A | | 10/2019 |
| WO | 2008/038790 A1 | | 4/2008 |

OTHER PUBLICATIONS

May 27, 2021 Search Report issued in International Patent Application No. PCT/CN2021/083728.

May 27, 2021 Written Opinion of the International Searching Authority issued in International Patent Application No. PCT/CN2021/083728.

Dec. 16, 2020 Office Action issued in Chinese Patent Application No. 202010344576.5.

* cited by examiner

Construct two or more basic unit signals according to an exploration requirement, where the two or more basic unit signals meet the following requirement: if a lowest frequency of dominant frequencies in a first basic unit signal is denoted as a fundamental frequency, lowest frequencies of the remaining basic units are $l \times 2^m$ times the fundamental frequency, where $l$ is an odd number except 1, and m is a natural number

Superpose the two or more basic unit signals to obtain a logarithmic non-uniform 2n sequence pseudo-random signal

Perform a phase adjustment on at least one of the two or more basic unit signals, and find a phase, as an optimal phase of the corresponding basic unit signal, that minimizes a mean square error of spectrum values corresponding to dominant frequencies in a superposed logarithmic non-uniform 2n sequence pseudo-random signal

Superpose the two or more basic unit signals according to the optimal phase to obtain a final logarithmic non-uniform 2n sequence pseudo-random signal

FIG. 1

METHOD AND SYSTEM FOR GENERATING LOGARITHMIC NON-UNIFORM PSEUDO-RANDOM ELECTROMAGNETIC EXPLORATION SIGNAL

TECHNICAL FIELD

The present invention relates to the field of geophysical exploration, and in particular, to a method and system for generating a logarithmic non-uniform pseudo-random electromagnetic exploration signal.

BACKGROUND

Descriptions herein only provide background techniques related to the present invention, and do not necessarily constitute the related art.

At present, there are various electromagnetic exploration methods, most of which perform signal encoding by adopting different pseudo-random encoding methods, especially in the field of frequency domain exploration. However, in the past, effective frequency band ranges of a large number of pseudo-random signals were often narrow, frequency components of exploration signals needed to be continuously changed during exploration, to obtain exploration information of different frequency intervals, and then the exploration information is successively transmitted, which is a great waste of time and increases exploration costs. Meanwhile, in many cases, prospectors are more interested in electromagnetic information in some frequency bands. However, past frequency domain pseudo-random exploration signals were often logarithmically and uniformly distributed, that is, frequency distributions within an entire frequency interval are uniform, which cannot well meet requirements of the prospectors for more frequencies within individual frequency intervals.

SUMMARY

In order to overcome the deficiency of the prior art, the present invention provides a method and system for generating a logarithmic non-uniform pseudo-random electromagnetic exploration signal, which can not only improve exploration resolution, but also increase a frequency density of some frequency intervals, so that the resolution of some frequency intervals during exploration is higher.

To achieve the foregoing objective, one or more embodiments of the present invention provide the following technical solutions:

A method for generating a logarithmic non-uniform pseudo-random electromagnetic exploration signal includes:
constructing two or more basic unit signals according to an exploration requirement, where the basic unit signals are stairstep signals obtained by superposing a plurality of in-phase periodic square wave signals, a frequency ratio between adjacent ones of the plurality of square wave signals is 2, and the two or more basic unit signals meet the following requirement: if a lowest frequency of dominant frequencies in a first basic unit signal is denoted as a fundamental frequency, lowest frequencies of the remaining basic unit signals are $l \times 2^m$ times the fundamental frequency, where l is an odd number except 1, and m is a natural number; and
superposing the two or more basic unit signals to obtain superposed stairstep signals, and correcting amplitudes to be consistent with amplitudes of square wave signals, to obtain a logarithmic non-uniform $2^n$ sequence pseudo-random signal.

One or more embodiments provide a system for generating a logarithmic non-uniform pseudo-random electromagnetic exploration signal, the system including:
a basic unit signal construction module, configured to construct two or more basic unit signals according to an exploration requirement, where the basic unit signals are stairstep signals obtained by superposing a plurality of in-phase periodic square wave signals, a frequency ratio between adjacent ones of the plurality of square wave signals is 2, and the two or more basic unit signals meet the following requirement: if a lowest frequency of dominant frequencies in a first basic unit signal is denoted as a fundamental frequency, lowest frequencies of the remaining basic unit signals are $l \times 2^m$ times the fundamental frequency, where l is an odd number except 1, and m is a natural number; and a pseudo-random signal generation module, configured to obtain a logarithmic non-uniform $2^n$ sequence pseudo-random signal by superposing the two or more basic unit signals.

One or more embodiments provide a terminal device, including: a processor and a computer-readable storage medium, the processor being configured to implement instructions, and the computer-readable storage medium being configured to store a plurality of instructions, where the instructions are adapted to be loaded by the processor to perform the method for generating a logarithmic non-uniform pseudo-random electromagnetic exploration signal.

One or more embodiments provide a computer-readable storage medium, storing a plurality of instructions therein, where the instructions are adapted to be loaded by a processor of a terminal device to perform the method for generating a logarithmic non-uniform pseudo-random electromagnetic exploration signal.

One or more embodiments provide an electrical exploration signal transmitter, configured to generate a logarithmic non-uniform $2^n$ sequence pseudo-random signal by using the method for generating a logarithmic non-uniform pseudo-random electromagnetic exploration signal.

One or more embodiments provide an electrical exploration signal transmitter, configured to generate a logarithmic non-uniform $2^n$ sequence pseudo-random signal by using the method for generating a logarithmic non-uniform pseudo-random electromagnetic exploration signal.

The foregoing one or more technical solutions have the following beneficial effects:

By means of the above technical solutions, a number of dominant frequencies can be increased within a limited frequency band range according to the exploration requirement, and $2^n$ sequence stairstep signals of different orders can be constructed within a limited frequency interval, so as to increase density between the dominant frequencies, facilitating improvement of resolution during electromagnetic exploration.

Through adjustment of the highest and lowest frequencies of basic unit signals and controlling of a multiple between the lowest frequencies of dominant frequencies in the basic unit signals to be $l \times 2^m$ times, a frequency density of some frequency intervals can be increased while increasing the exploration resolution of required exploration depths, so that the resolution of some frequency intervals during exploration can be higher, thereby meeting the requirements of prospectors.

The logarithmic non-uniform pseudo-random signals can be simultaneously transmitted and received at dozens of frequencies. Compared with conventional single-frequency or multi-frequency transmission of signals, mass data collection can be achieved, and frequency density can be increased, thereby enhancing resolution of longitudinal exploration. In addition, an effective frequency distribution can be designed according to the exploration requirement, so as to better focus on especially concerned frequency bands. Under the condition that total working hours are the same, data for a longer period of time may be collected at each frequency, which can better suppress the influence of background noise, thereby improving the anti-interference capability. In the meanwhile, only one set of combined waveforms need to be transmitted during data collection without the need to change transmission waveforms. In addition, a plurality of receivers may be adopted to perform continuous rolling measurement, which fundamentally changes an observation mode of the conventional method for electromagnetic exploration that use artificial sources, thus achieving efficient collection of field data, which is especially applicable to large-area 3D exploration, and greatly reduces exploration costs. At present, the technical solutions have been successfully applicable to real explorations in the field.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

FIG. 1 is a flowchart of a method for generating a logarithmic non-uniform pseudo-random electromagnetic exploration signal according to an embodiment of the present invention.

Figure 2:
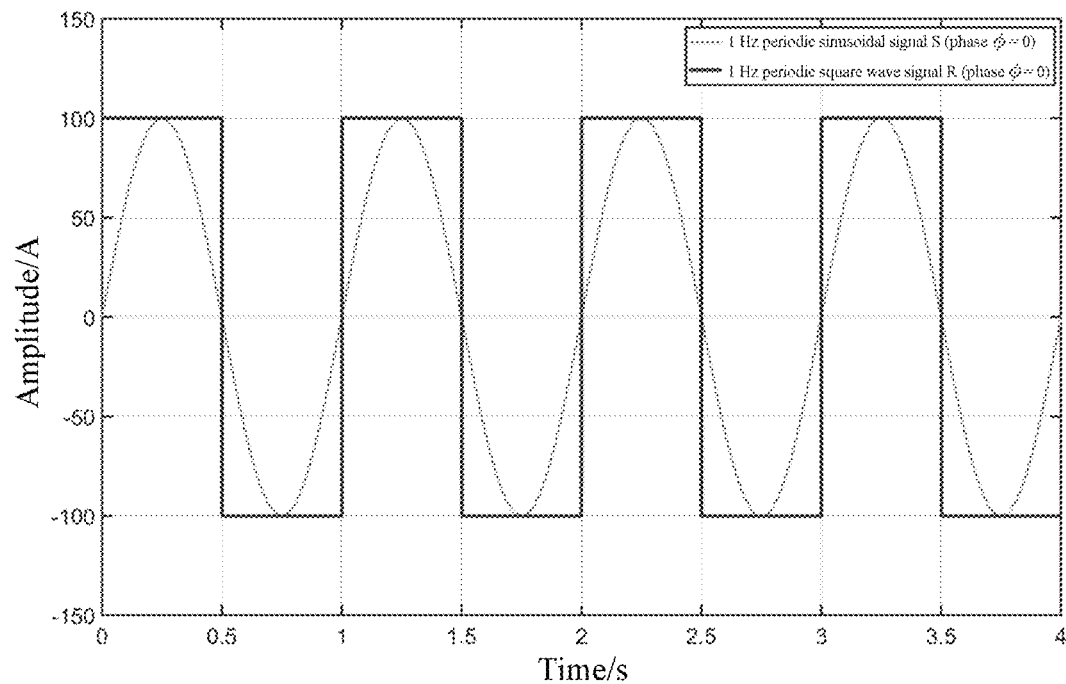
FIG. 2 is a schematic diagram of a correspondence between a 1 Hz periodic sinusoidal signal and a 1 Hz periodic square wave signal (a phase $\varphi=0$) according to an embodiment of the present invention.

In the spectrogram involved in the above figures, a spectrum value only exists at an inflection point of a broken line. In order to show the magnitude and the changing trend of spectrum amplitudes more clearly, broken line graphs are adopted for representation in the embodiments of the present invention.

DETAILED DESCRIPTION

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

The embodiments in the present invention and features in the embodiments may be mutually combined in case that no conflict occurs.

In addition, for demonstration, a computer simulation signal is to be used as an example for description. An adopted sampling frequency is far higher than a highest dominant frequency in a pseudo-random signal, and computation errors caused by signal discretization after a computer is introduced can be ignored.

Embodiment I

This embodiment discloses a method for generating a logarithmic non-uniform pseudo-random electromagnetic exploration signal. As shown in FIG. 1, the method includes the following steps.

Step 1: Construct two or more basic unit signals according to an exploration requirement, where the basic unit signals are stairstep signals obtained by superposing a plurality of in-phase periodic square wave signals, and a frequency ratio between adjacent ones of the plurality of periodic square wave signals is 2.

A method for generating a periodic square wave signal includes:

generating sinusoidal signals having the same frequency as a target periodic square wave, setting values of the sinusoidal signals that are greater than 0 to A, setting values of the sinusoidal signals that are less than 0 to $-A$, and respectively setting 0 positions to A and $-A$ according to position index parities, specifically, identifying all 0 positions in the signals by using the index, and setting the positions to A and $-A$ according to parities, for example, setting values of the $1^{st}$, $3^{rd}$, $5^{th}$, . . . 0 positions to A, and setting values of the $2^{nd}$, $4^{th}$, $6^{th}$, . . . 0 positions to $-A$, to obtain a series of periodic square wave signals having the same phase, where $A \neq 0$, a value of the phase may be adjusted as required, and the phase in this embodiment is 0.

A frequency range of dominant frequencies of the periodic square wave is related to a depth of exploration, and the lowest frequency and the highest frequency of the dominant frequencies may be selected according to requirements for to-be-explored depths (such as deep, shallow, or other specific exploration depths) and empirical equations as assistance. Specifically, a range of the to-be-explored depths required by a user is acquired, the highest frequency and the lowest frequency are determined according to the range of to-be-explored depths, and then multiples are increased according to the acquired frequency required to obtain a corresponding frequency of the target periodic square wave.

1 Hz is used as an example for description. Firstly, a 1 Hz sinusoidal signal having an amplitude of 100 and a phase of 0 is generated: $S(t)=A \sin(2\pi f t+\phi)$, where S(t) is a sinusoidal signal, A is an amplitude, $\phi$ is a phase, and f is a signal frequency. When the amplitude is 100, A=100, and the phase is 0, $\phi$=0, and when the frequency is 1 Hz, f=1.

The values greater than 0 in the sinusoidal signals are set to 100, the values less than 0 are set to $-100$, and the positions equal to 0 are set to 100 or $-100$ according to the position index parity. In this way, a 0-phase square wave signal of 1 Hz may be generated. As shown in FIG. 2, signals having all frequency amplitudes being 100 and the phase being 0 may be generated in this way.

R(t) is set to a periodic square wave signal, and when S(t) of the sinusoidal signal at a position t is a positive value, a signal value is set to A, that is, R(t)=A at the position t corresponding to a time position. When S(t) of the sinusoidal signal at a position t is a negative value, the signal value is set to $-A$, that is, R(t)=$-A$ at the position t corresponding to the time position. In this embodiment, all phases of the sinusoidal signals are set to 0, A=100, the values greater than 0 in the sinusoidal signals are set to 100, the values less than 0 are set to $-100$, and the 0 positions are respectively set to 100 and $-100$ according to the index parity.

Figure 3:
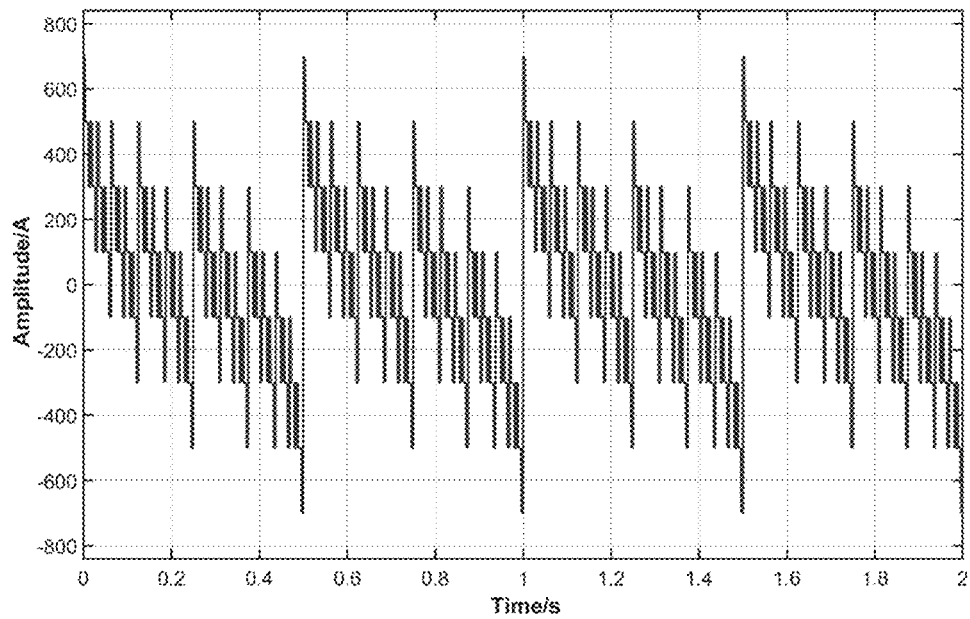
FIG. 3 is a schematic diagram of a step signal obtained by superposing 7 frequencies according to an embodiment of the present invention.
Figure 4:
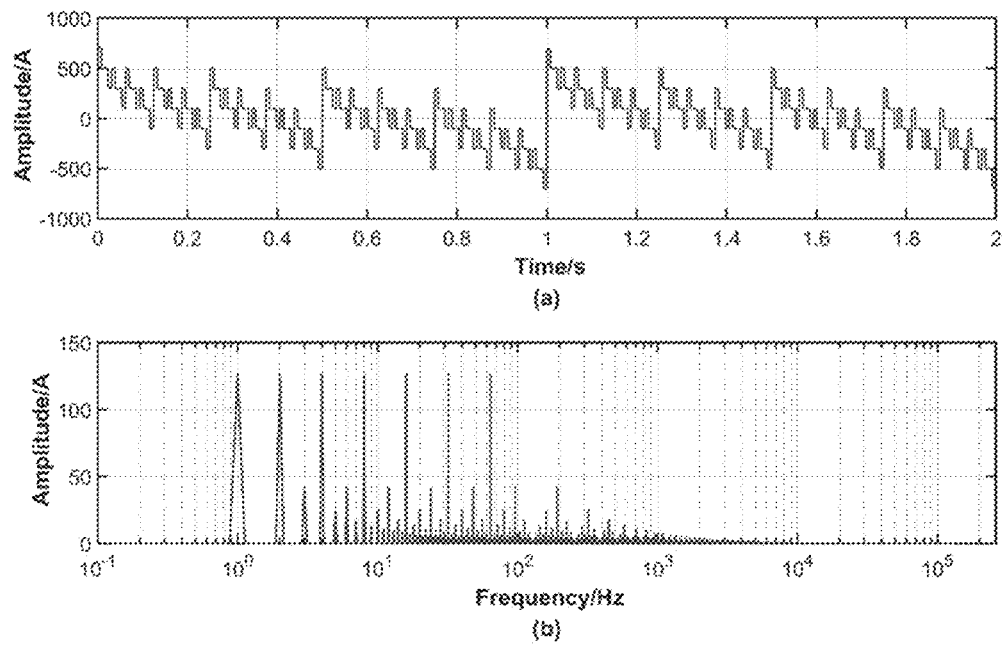
FIG. 4 is a schematic diagram of a step signal obtained by superposing 7 frequencies and spectrum features of the step signal according to an embodiment of the present invention.
Figure 5:
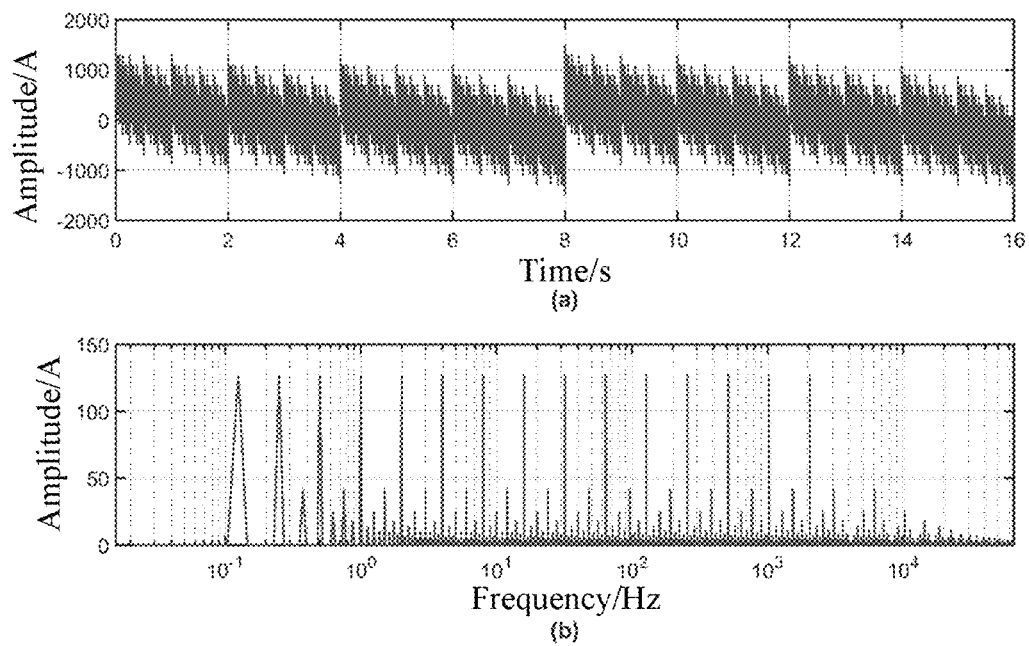
FIG. 5 shows time domain waveforms and spectrum features corresponding to a 0.125 Hz-15 frequency-0 phase basic unit signal according to an embodiment of the present invention.

In this embodiment, for ease of description, the lowest frequency of the periodic square wave signal is referred to as a fundamental frequency, and the fundamental frequency of the signal generated in FIG. 5 is 1 Hz. It is to be noted that, superposed signals herein need to be at $2^n$ sequence frequencies, that is, the frequency between adjacent square waves needs to be continuously increased by multiples of 2. Periodic square wave signals having other frequencies such as 2 Hz, 4 Hz, 8 Hz, . . . , and 64 Hz with 1 Hz as the fundamental frequency and the phase being 0 can be generated according to the method. However, after the periodic square wave signals having 1 Hz, 2 Hz, 4 Hz, 8 Hz, 16 Hz, 32 Hz, and 64 Hz and the phase of 0 are superposed, a step signal having a plurality of frequencies may be obtained, waveforms and corresponding spectrum features after superposition are shown in FIG. 3, and the step signal is used as a first basic unit signal.

The lowest frequency of the basic unit signal may be changed, and a quantity of frequencies may not be necessarily an odd number, and may be an even number. In this embodiment, the lowest frequency of the first basic unit signal is a fundamental frequency, lowest frequencies of the remaining basic unit signals shall be $l \times 2^m$ times the fundamental frequency, and the lowest frequencies of the basic unit signals differ from each other, where l is an odd number except 1, such as 3, 5, 7 . . . , and m is a natural number, such as 0, 1, 2, 3, 4, . . . .

In this embodiment, a sum of quantities of dominant frequencies in different basic unit signals is required to be an odd number rather than an even number. It is proved by mathematics that an amplitude of an odd quantity of periodic square wave signals (the signal has values of only 100 and $-100$) that are superposed cannot be 0, but an integer multiple of 100 or $-100$. Therefore, after superposition, only positions greater than 100 need to be set to 100 and positions less than $-100$ need to be set to $-100$. Assuming that a quantity of dominant frequencies in a first basic unit signal is $a_1$, a quantity of dominant frequencies in a second basic unit signal is $a_2$, and a quantity of dominant frequencies in a third basic unit signal is $a_3$, $Num_f$ is a sum $Num_f = a_1 + a_2 + a_3$ of the quantities of dominant frequencies in all of the basic unit signals. It is not hard to find that, when n-order $2^n$ sequence pseudo-random signals are constructed, $Num_f = a_1 + a_2 + a_3 + \cdots + a_n$, where $a_n$ is a quantity of dominant frequencies in an $n^{th}$ basic unit signal. In the present invention, when the logarithmic non-uniform $2^n$ sequence pseudo-random signals are constructed, $Num_f$ needs to be an odd number, and it has no requirements for whether the quantity of domain frequencies in each basic unit signal is the odd number. In addition, under normal circumstances, $a_1$ should be greater than a quantity of dominant frequencies in other basic unit signals, so as to restrain the highest frequency in the logarithmic non-uniform $2^n$ sequence pseudo-random signals. The lowest frequencies and highest frequencies of the remaining basic unit signals shall fall within a frequency interval between the lowest frequency and the highest frequency in a first basic unit signal, and the basic unit signals have no repeated frequencies.

According to the construction requirements that a multiple relationship of $1 \times 2^m$ between fundamental frequencies is satisfied and the sum of quantities of dominant frequencies is an odd number, the processing difficulty of the follow-up superposed signals is simplified, so as to efficiently obtain the logarithmic non-uniform $2^n$ sequence pseudo-random signals as required by exploration. In addition, in order to facilitate generation of pseudo-random signals, in a logarithmic coordinate, frequency intervals having the same length have different quantities of dominant frequencies, and densities of the dominant frequencies are different, so as to generate a logarithmic non-uniform high-order $2^n$ sequence pseudo-random exploration signal.

Figure 19:
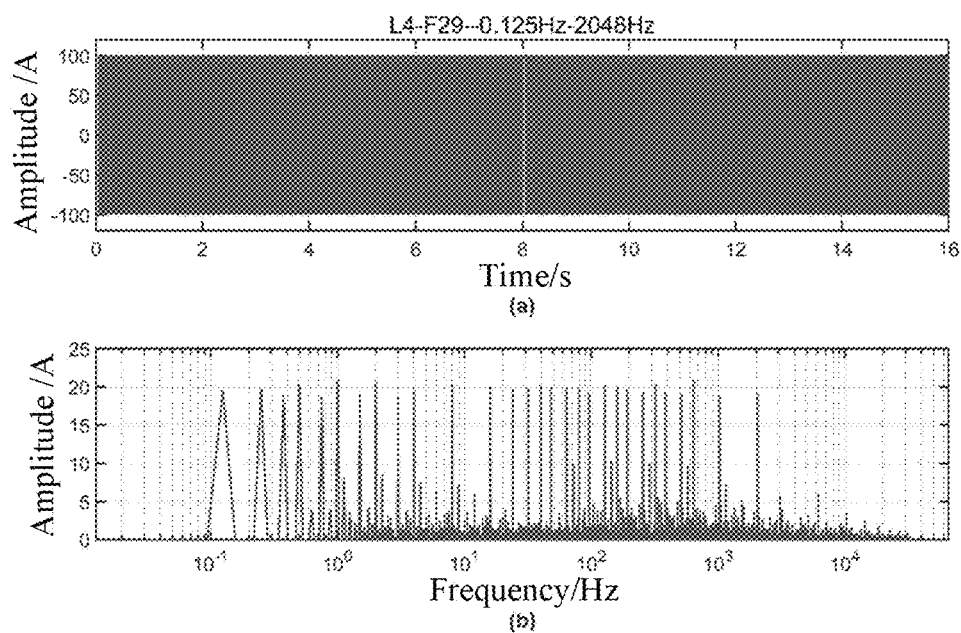
FIG. 19 shows time domain waveforms and spectrum features corresponding to a pseudo-random signal L4-F29-0.125 Hz-2048 Hz generated by a 0.125 Hz-15 frequency-0 phase basic unit signal, a 0.375 Hz-4 frequency-5π/9 phase basic unit signal, a 24 Hz-5 frequency-4π/9 phase basic unit signal, and a 40 Hz-5 frequency-π/3 phase basic unit signal according to an embodiment of the present invention.

In this embodiment, the quantity of frequencies in the basic unit signal may be changed, and the order of pseudo-random signals may be named according to the quantity of frequencies in the basic unit signal, for example, if a pseudo-random signal is generated by 4 basic unit signals, the 4 basic unit signals have 29 dominant frequencies in total, and a lowest frequency is 0.125 Hz and a highest frequency is 2048 Hz, the pseudo-random signal is named an L4-F29-0.125 Hz-2048 Hz signal, as shown in FIG. 19. L is short for Level and means an order, and F is short for frequency and means the quantity of dominant frequencies included by signals. Different orders represent degrees of density between dominant frequencies. A 2-order represents a larger degree of density than that of a 1-order, and a 3-order represents a larger degree of density than that of the 2-order, and so on.

In this embodiment, the quantity of dominant frequencies is added within a limited range of frequency bands according to the exploration requirement, and $2^n$ sequence stairstep signals of different orders are constructed within a limited frequency interval, so that the density between the dominant frequencies within the frequency interval of interest, thereby meeting the requirement of the prospector for more frequencies within the individual frequency interval.

Step 2: Superpose the two or more basic unit signals to obtain a superposed stairstep signal.

However, for the pseudo-random signal obtained by directly adding the two basic unit signals, energy between spectra of the dominant frequencies differs greatly, and therefore the pseudo-random signal is not applicable to electromagnetic exploration in the frequency domain. As a result, the superposition method needs to be optimized.

Step 3: Perform a phase adjustment on at least one of the two or more basic unit signals, find a phase, as an optimal phase of the corresponding basic unit signal, that minimizes an RMS error of spectrum values corresponding to dominant frequencies in a superposed logarithmic non-uniform $2^n$ sequence pseudo-random signal, and superpose the two or more basic unit signals according to the optimal phase to obtain a logarithmic non-uniform $2^n$ sequence pseudo-random signal.

In this embodiment, uniformity between amplitudes of dominant frequencies is determined by calculating a magnitude of an RMS error of the amplitudes of dominant frequencies, and a phase that minimizes data of the RMS error is selected as the optimal phase, so that amplitudes corresponding to main frequencies (dominant frequencies) are uniform, that is, energy of the dominant frequencies is distributed more uniformly. Specifically, by continuously changing phases of a basic signal construction unit, that is, $\phi$ in the formula of generating a sinusoidal signal, a stairstep signal superposed by periodic square wave signals of corresponding phases is further generated. Logarithmic non-uniform $2^n$ sequence pseudo-random signals are generated by using such a combination mode, so that the amplitudes corresponding to the main frequencies (dominant frequencies) are uniform, that is, the energy of the dominant frequencies is distributed more uniformly.

Specifically, for basic unit signals on which a phase adjustment is performed, a phase radian $\pi$ in half a period is firstly divided into N parts (after a part is greater than the phase radian $\pi$ in the half period, signals are reversed, but overall forms of the signals are consistent, and therefore only the phases of the half period need to be considered), that is, a phase-changed basic unit signal is $\pi/N$. One phase-changed basic unit signal is adjusted each time, and the RMS error of the spectrum values corresponding to the dominant frequencies in the superposed logarithmic non-uniform $2^n$ sequence pseudo-random signal is recorded. A variation curve of the RMS error with the phase is drawn, and a phase that minimizes the RMS error is found as an optimal phase of the basic unit signal.

Figure 6:
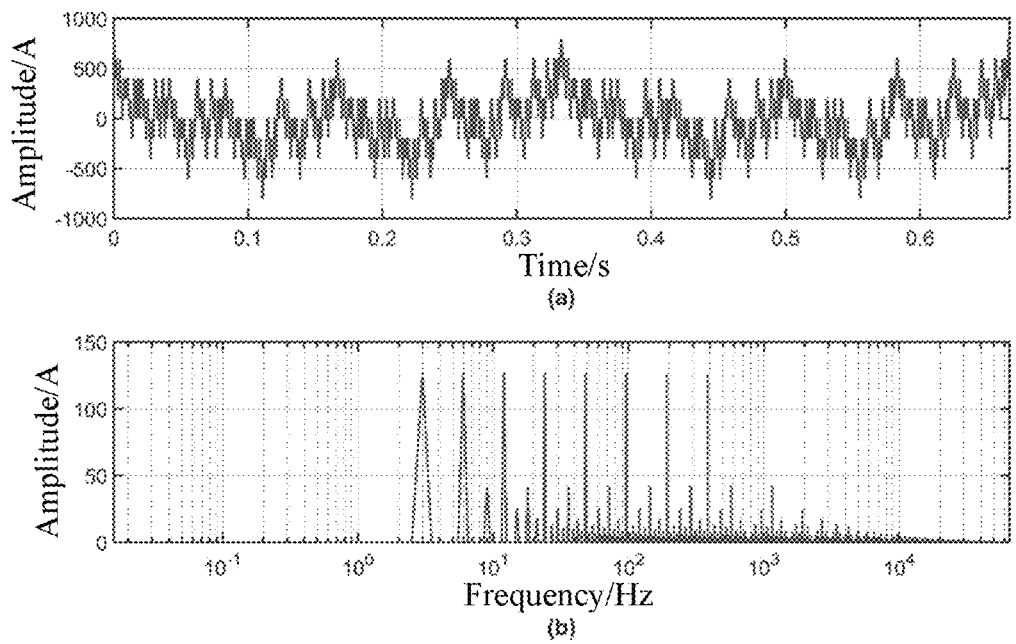
FIG. 6 shows time domain waveforms and spectrum features corresponding to a 3 Hz-8 frequency-98π/180 phase basic unit signal according to an embodiment of the present invention.
Figure 7:
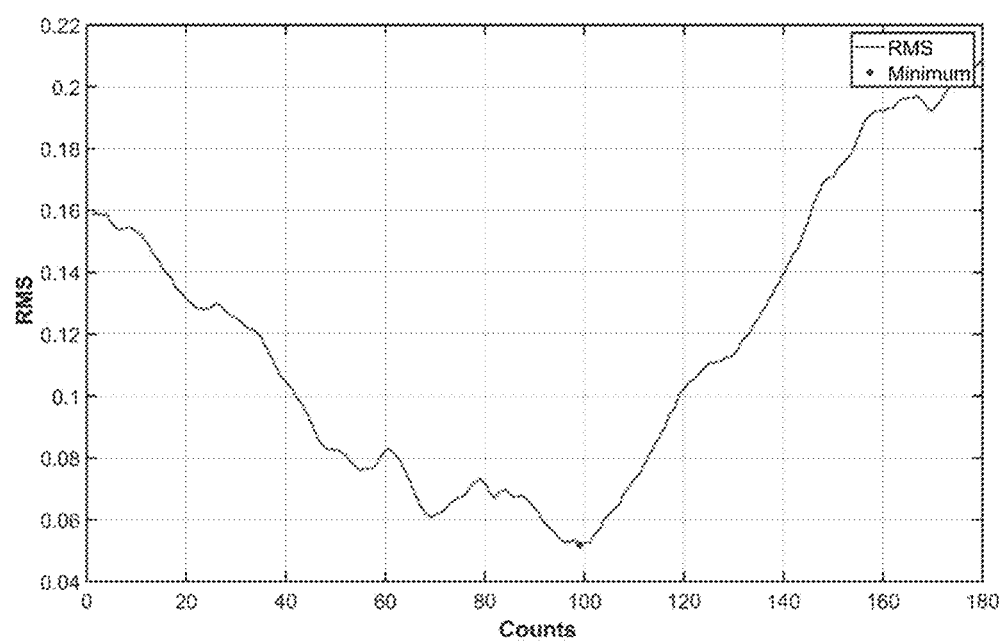
FIG. 7 shows a variation curve of relative mean square (RMS) errors of amplitudes of spectrum features of dominant frequencies when phases of a 2-order signal basic unit signal are changed according to an embodiment of the present invention.
Figure 8:
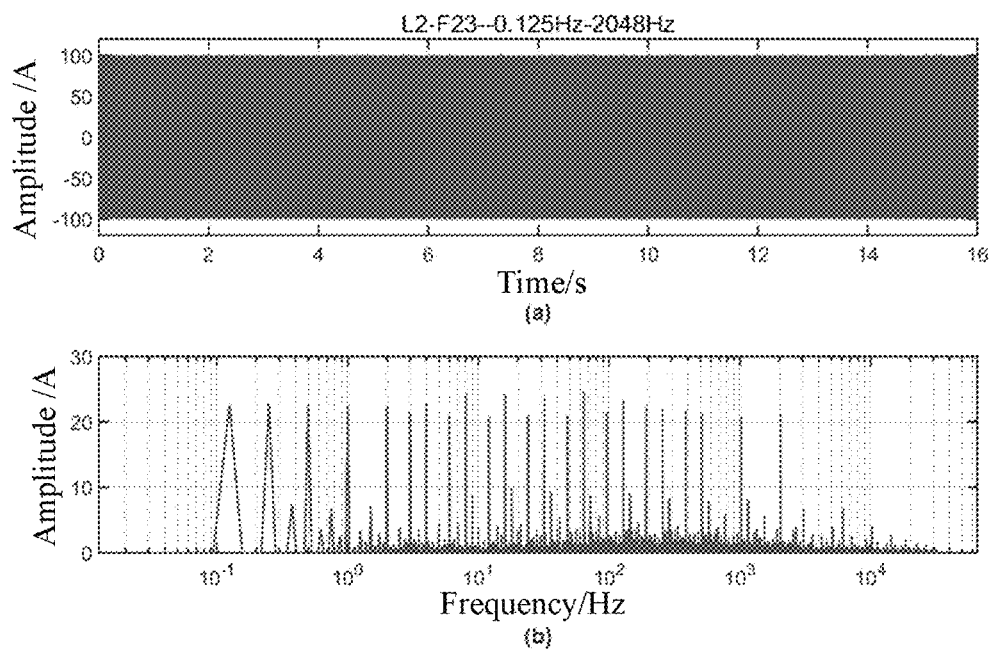
FIG. 8 shows a 2-order 2″ sequence pseudo-random signal generated by 125 Hz-15 frequency-0 phase and 3 Hz-8 frequency-98π/180 phase basic unit signal according to an embodiment of the present invention.

A pseudo-random signal is constructed by two basic unit signals. A stairstep signal (see FIG. 5) superposed by a first basic unit signal having 15 frequencies at 0.125 Hz-2048 Hz and a stairstep signal (see FIG. 6) by a second basic unit signal having 8 frequencies at 3 Hz-384 Hz are used as examples. A logarithmic non-uniform $2^n$ sequence pseudo-random signal is generated by using the two stairstep signals. N=180, which is divided into $\pi/180$ as a phase-changed basic unit signal, the phase is changed by $\pi/180$ each time, which is successively increased, that is, a value of $\phi$ in the formula is changed each time, and possible values thereof are successively 0, $\pi/180$, $2\pi/180$, $3\pi/180$, ..., and $179\pi/180$. Firstly, the phase of the second basic unit signal is changed, so as to obtain the minimum value of the RMS error of the spectra of the dominant frequencies in the generated pseudo-random signal when s=987080, as shown in FIG. 7. Based on the phase, the generated pseudo-random signal is shown in FIG. 8.

Figure 9:
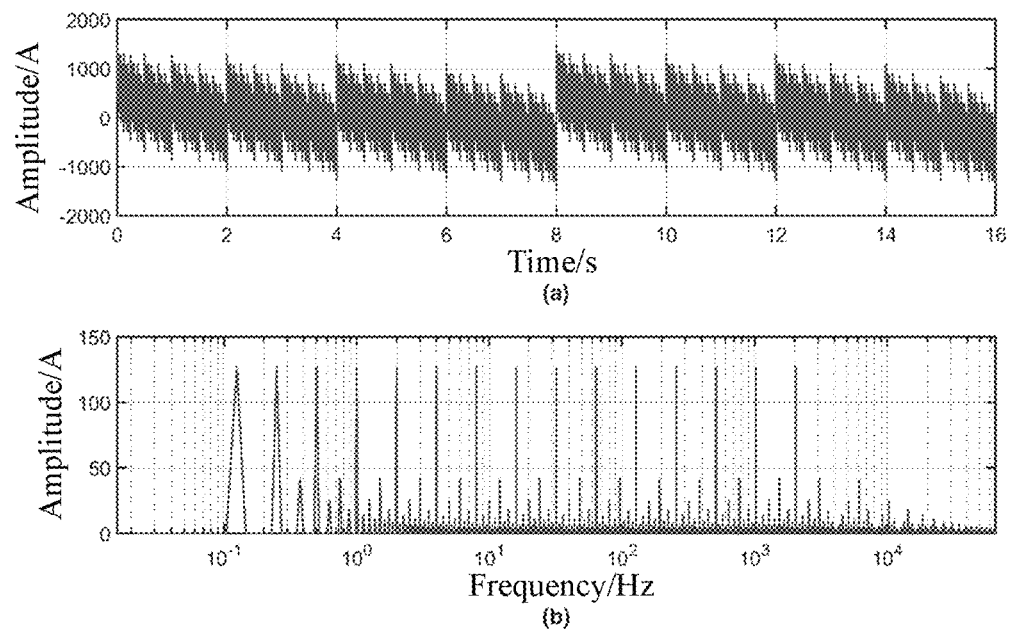
FIG. 9 shows time domain waveforms and spectrum features corresponding to a 125 Hz-15 frequency-0 phase basic unit signal according to an embodiment of the present invention.
Figure 10:
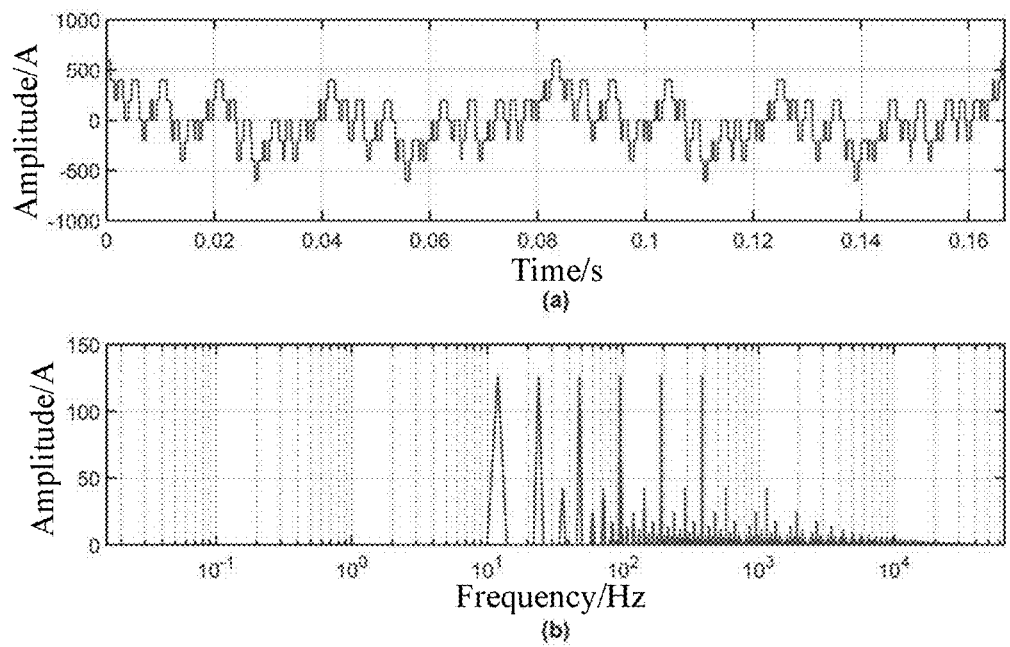
FIG. 10 shows time domain waveforms and spectrum features corresponding to a 12 Hz-6 frequency-5π/12 phase basic unit signal according to an embodiment of the present invention.
Figure 11:
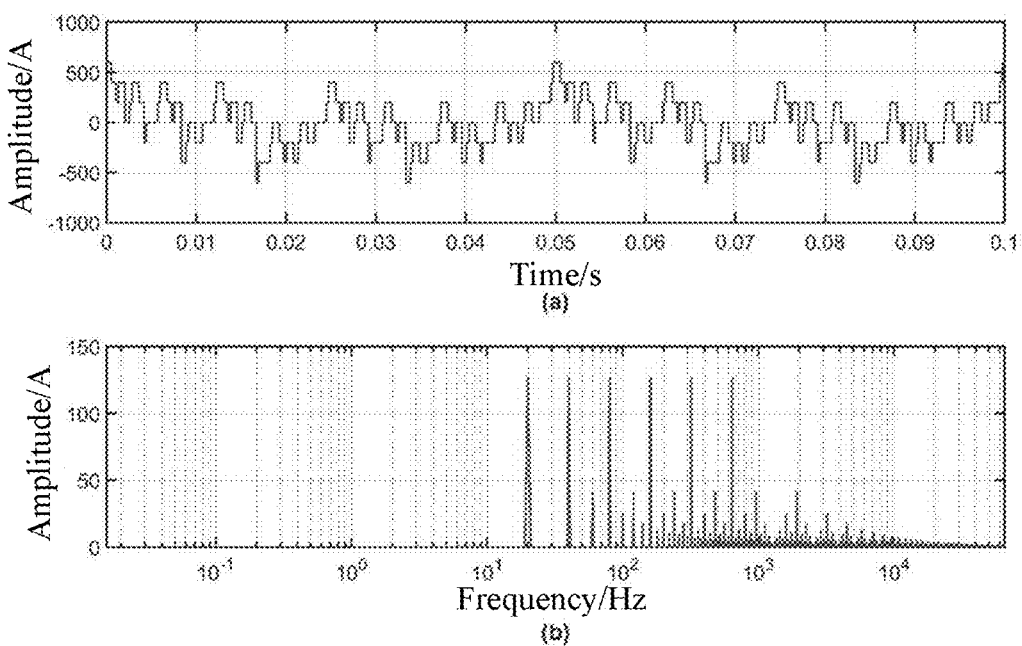
FIG. 11 shows time domain waveforms and spectrum features corresponding to a 20 Hz-6 frequency-π/3 phase basic unit signal according to an embodiment of the present invention.
Figure 12:
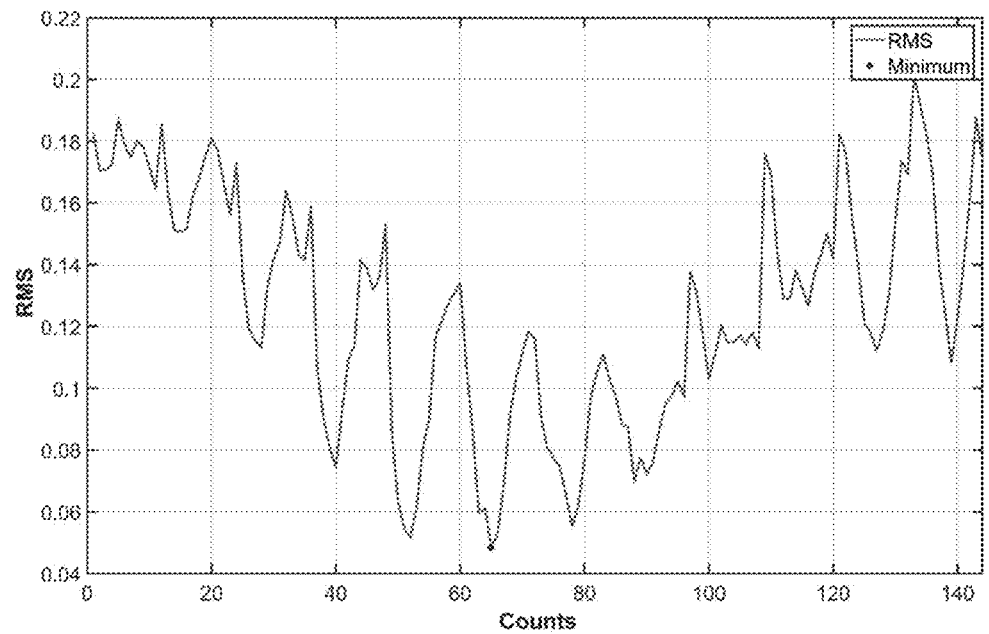
FIG. 12 shows a variation curve of RMS errors of amplitudes of spectrum features of dominant frequency when phases of a 3-order signal basic unit signal are changed according to an embodiment of the present invention.
Figure 13:
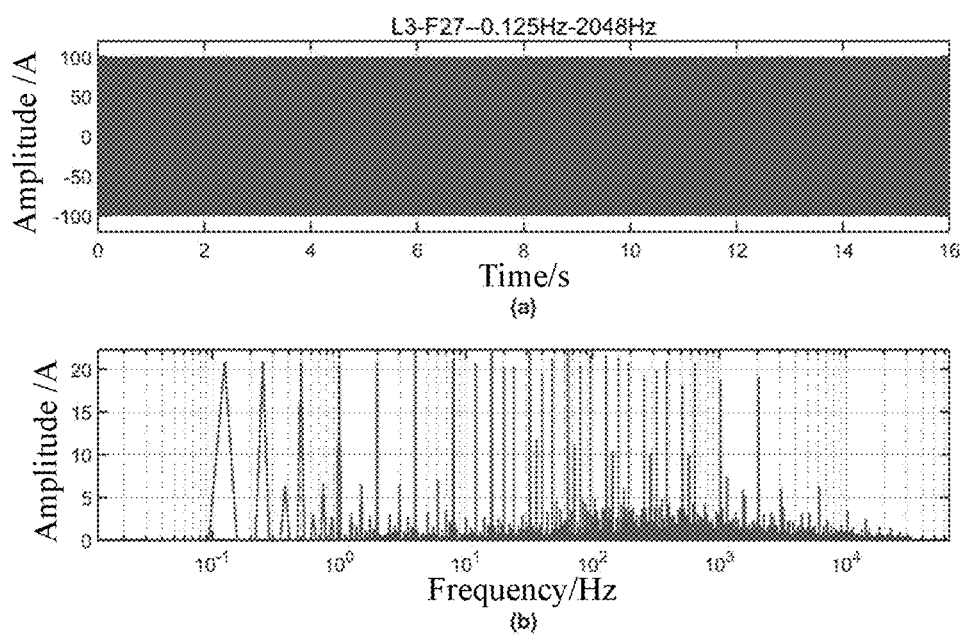
FIG. 13 shows time domain waveforms and spectrum features of corresponding pseudo-random signals at a 1 Hz-7 frequency-0 phase and a 3 Hz-6 frequency-2π/5 phase according to an embodiment of the present invention.

A pseudo-random signal is constructed by three basic unit signals. A stairstep signal (see FIG. 9) superposed by a first basic unit signal having 15 frequencies at 0.125 Hz-2048 Hz, a stairstep signal (see FIG. 10) superposed by a second basic unit signal having 6 frequencies at 12 Hz-384 Hz, and a stairstep signal (see FIG. 11) superposed by a third basic unit signal having 6 frequencies at 20 Hz-640 Hz are used as examples. A logarithmic non-uniform $2^n$ sequence pseudo-random signal is generated by using the three stairstep signals. N=12, that is, $\pi/12$ is used as a phase-changed basic unit signal, by continuously changing values of the phase $\phi_1$ of the second basic unit signal and the phase $\phi_2$ of the third basic unit signal, the minimum value of the RMS error of the spectra of the dominant frequencies in the generated pseudo-random signal is obtained when $\phi_1=5\pi/12$ and $\phi_2=\pi/3$, as shown in FIG. 12. Based on the phase, the generated pseudo-random signal is shown in FIG. 13.

Figure 14:
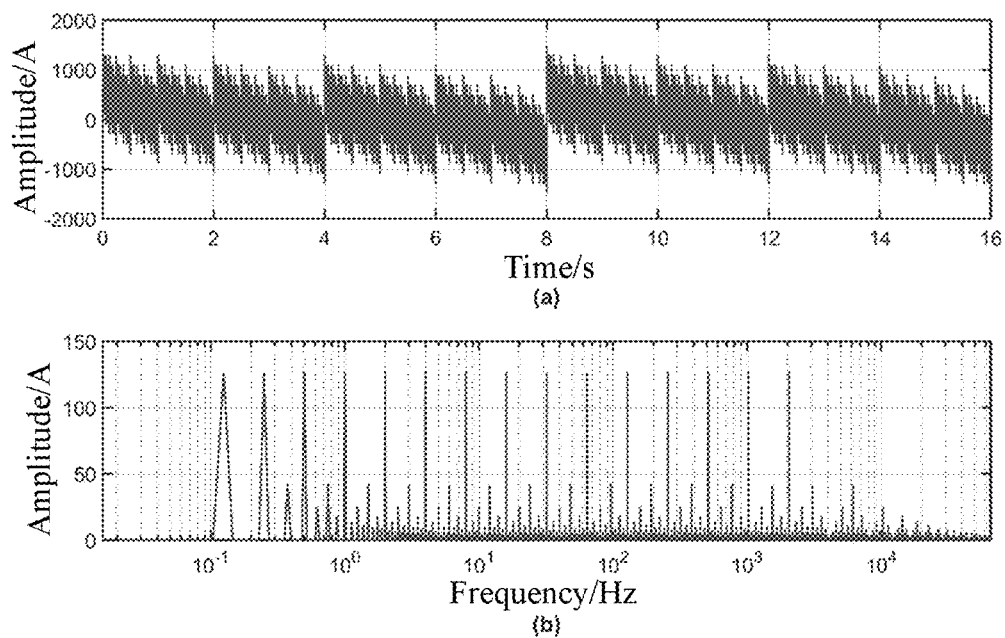
FIG. 14 shows time domain waveforms and spectrum features of pseudo-random signals constructed and generated at a 0.125 Hz-15 frequency-0 phase, a 12 Hz-6 frequency-5π/12 phase, and a 20 Hz-6 frequency-π/3 phase according to an embodiment of the present invention.

A pseudo-random signal is constructed by four basic unit signals. A stairstep signal (see FIG. 14) superposed by first basic unit signals having 15 frequencies at 0.125 Hz-2048

Figure 15:
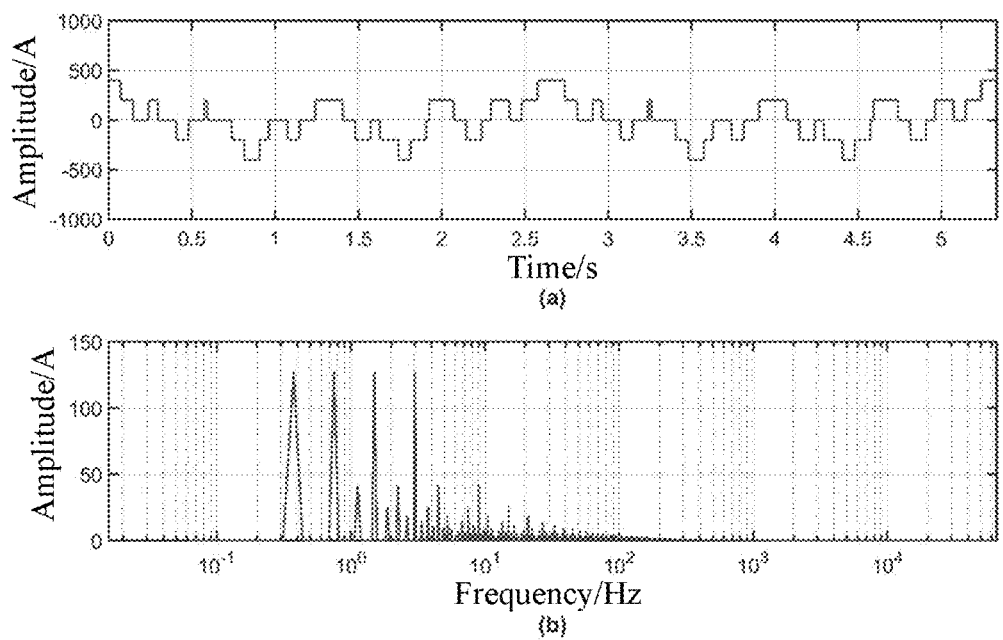
FIG. 15 shows time domain waveforms and spectrum features corresponding to a 0.375 Hz-4 frequency-5π/9 phase basic unit signal according to an embodiment of the present invention.
Figure 16:
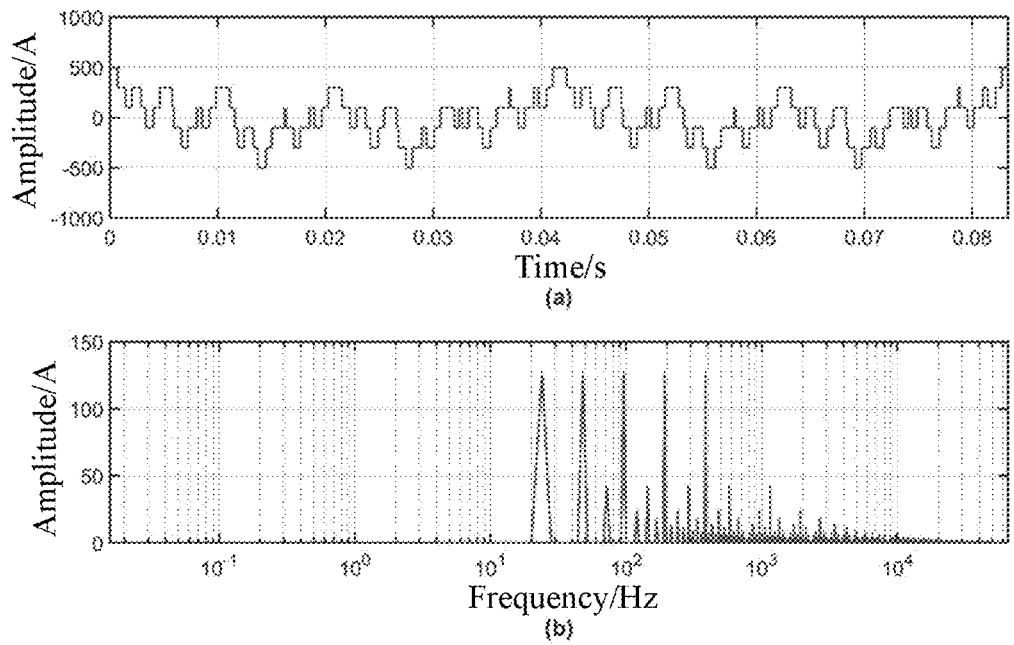
FIG. 16 shows time domain waveforms and spectrum features corresponding to a 24 Hz-5 frequency-4π/9 phase basic unit signal according to an embodiment of the present invention.
Figure 17:
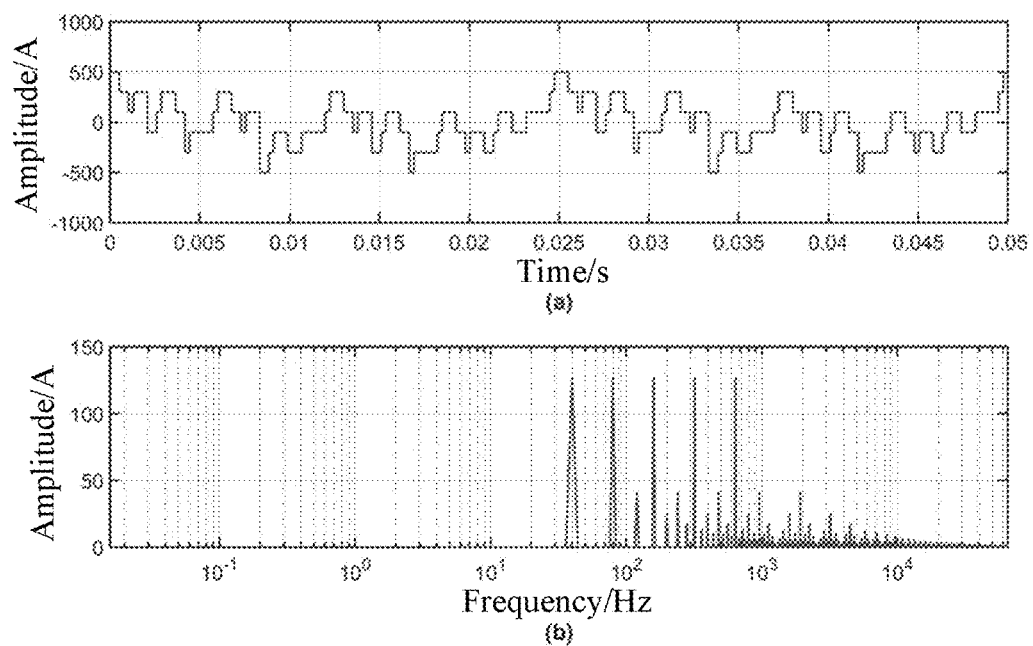
FIG. 17 shows time domain waveforms and spectrum features corresponding to a 40 Hz-5 frequency-π/3 phase basic unit signal according to an embodiment of the present invention.
Figure 18:
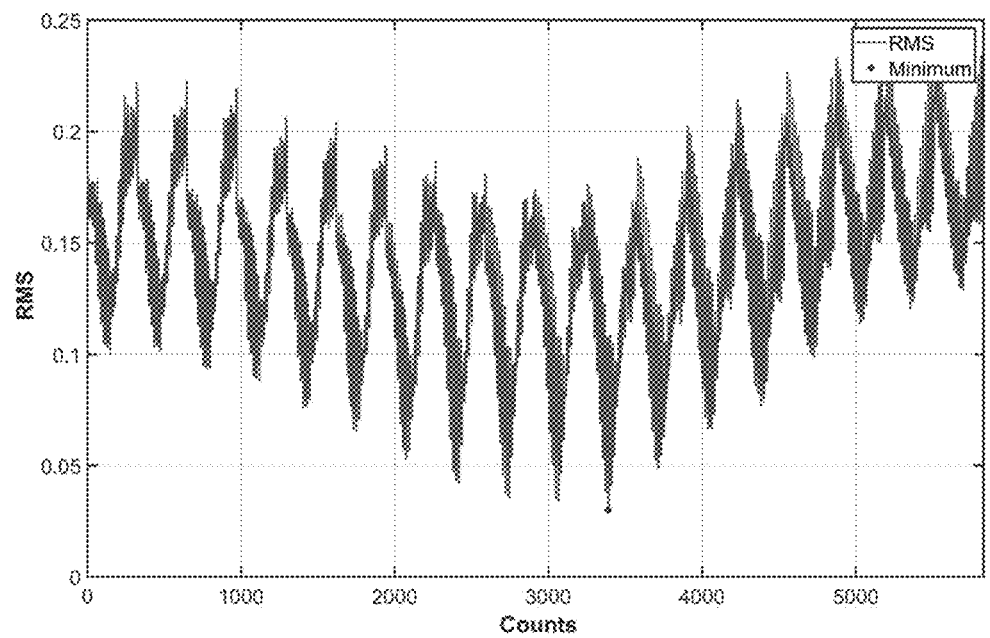
FIG. 18 shows a variation curve of RMS errors of spectrum features of dominant frequencies when phases of a 3-order 2″ sequence signal basic unit signal are changed according to an embodiment of the present invention.

Hz, a stairstep signal (see FIG. 15) superposed by second basic unit signals having 4 frequencies at 0.375 Hz-3 Hz, a stairstep signal (see FIG. 16) superposed by third basic unit signals having 5 frequencies at 24 Hz-384 Hz, and a stairstep signal (see FIG. 17) superposed by a fourth basic unit signal having 5 frequencies at 40 Hz-640 Hz are used as examples. A logarithmic non-uniform $2^n$ sequence pseudo-random signal is generated by using the four stairstep signals. N=18, that is, $\pi/18$ is used as a phase-changed basic unit signal, by continuously changing values of the phase $\phi_1$ of the second basic unit signal, the phase $\phi_2$ of the third basic unit signal, and the phase $\phi_3$ of the fourth basic unit signal, the minimum value of the RMS error of the spectra of the dominant frequencies in the generated pseudo-random signal is obtained when $\phi_1=5\pi/9$, $\phi_2=4\pi/9$, and $\phi_3=\pi/3$, as shown in FIG. 18. Based on the phase, the generated pseudo-random signal is shown in FIG. 19.

Figure 20:
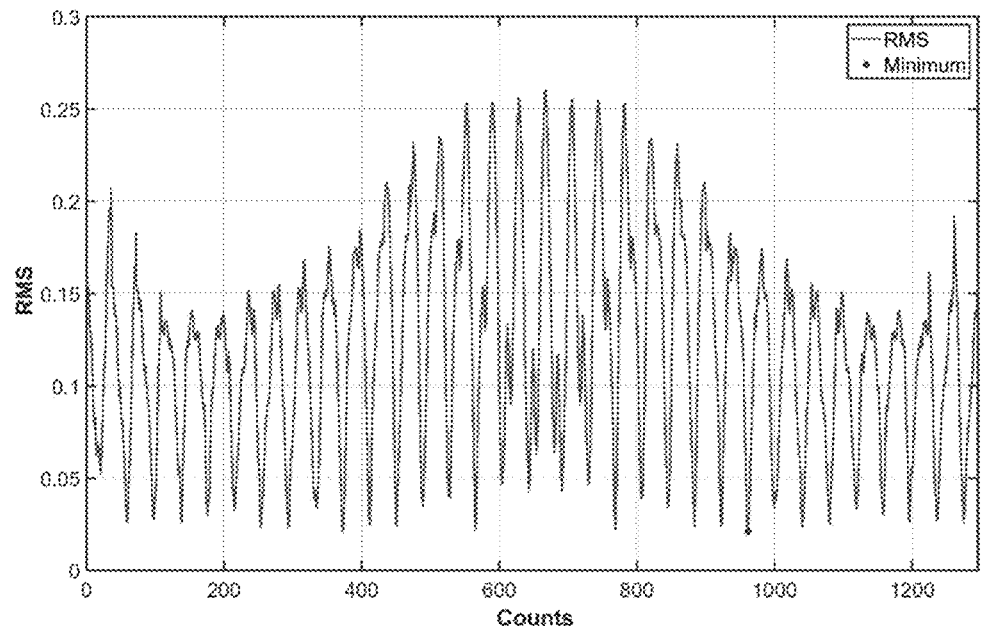
FIG. 20 is a variation curve of RMS errors of spectrum features of dominant frequencies of a 2-order signal changing with a phase according to an embodiment of the present invention.
Figure 21:
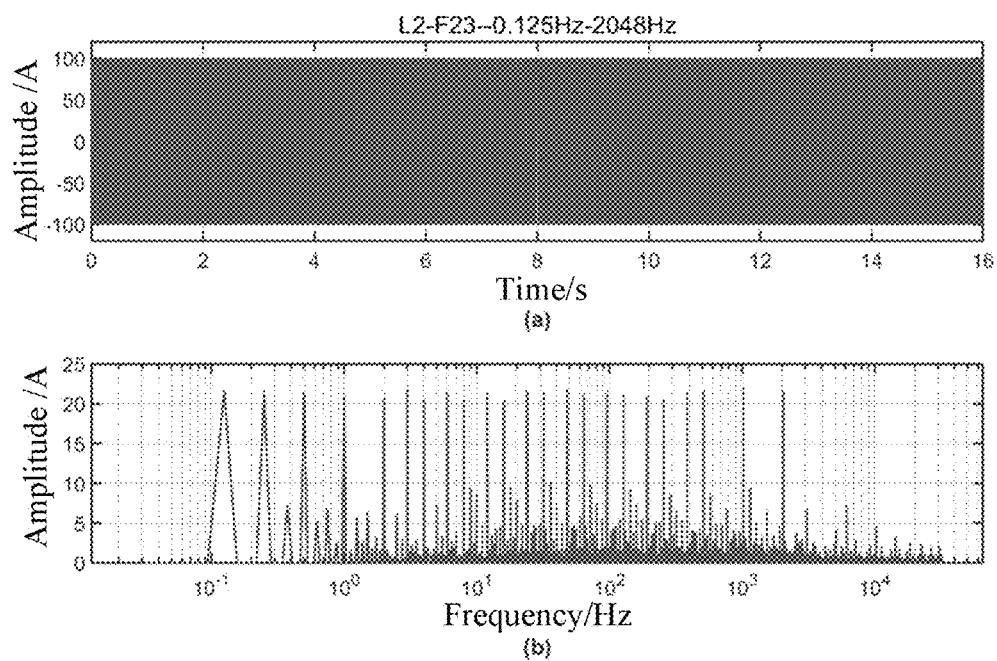
FIG. 21 shows time domain waveforms and spectrum features of corresponding pseudo-random signals at a 1 Hz-15 frequency-13π/18 phase and a 3 Hz-8 frequency-2π/3 phase according to an embodiment of the present invention.

Certainly, the corresponding phase $\phi$ of the first basic unit signal is allowed to be changed. When a 125 Hz-15 frequency basic unit signal and a 3 Hz-8 frequency basic unit signal are superposed to generate a $2^n$ sequence signal, the phases of two basic unit signals are changed simultaneously. When N=36, a variation curve of corresponding RMS errors is shown in FIG. 20. Corresponding phases of the two basic unit signals at the minimum value points are respectively $13\pi/18$ and $\pi/3$, and at this point, time domain waveforms and spectra of corresponding 2-order $2^n$ sequence pseudo-random signals are shown in FIG. 21.

Embodiment II

An objective of this embodiment is to provide a system for generating a logarithmic non-uniform pseudo-random electromagnetic exploration signal, the system including:
 a basic unit signal construction module, configured to construct two or more basic unit signals according to an exploration requirement, where the basic unit signals are stairstep signals obtained by superposing a plurality of in-phase periodic square wave signals, a frequency ratio between adjacent ones of the plurality of square wave signals is 2, and the two or more basic unit signals meet the following requirement: if a lowest frequency of dominant frequencies in a first basic unit signal is denoted as a fundamental frequency, lowest frequencies of the remaining basic unit signals are $l\times2^m$ times the fundamental frequency, where l is an odd number except 1, and m is a natural number; and
 a logarithmic non-uniform pseudo-random signal generation module, configured to obtain a logarithmic non-uniform $2^n$ sequence pseudo-random signal by superposing the two or more basic unit signals.

Embodiment III

An objective of this embodiment is to provide a computer-readable storage medium, storing a plurality of instructions, the instructions being adapted to be loaded by a processor of a terminal device to perform steps of:
 constructing two or more basic unit signals according to an exploration requirement, where
 the basic unit signals are stairstep signals obtained by superposing a plurality of in-phase periodic square wave signals, a frequency ratio between adjacent ones of the plurality of square wave signals is 2, and the two or more basic unit signals meet the following requirement: if a lowest frequency of dominant frequencies in a first basic unit signal is denoted as a fundamental frequency, lowest frequencies of the remaining basic unit signals are $l\times2^m$ times the fundamental frequency, where l is an odd number except 1, and m is a natural number; and
 superposing the two or more basic unit signals to obtain a logarithmic non-uniform $2^n$ sequence pseudo-random signal.

Embodiment IV

An objective of this embodiment is to provide a terminal device, including: a processor and a computer readable storage medium, the processor being configured to implement instructions, the computer readable storage medium being configured to store a plurality of instructions, where the instructions are adapted to be loaded by the processor to perform steps of:
 constructing two or more basic unit signals according to an exploration requirement, where
 the basic unit signals are stairstep signals obtained by superposing a plurality of in-phase periodic square wave signals, a frequency ratio between adjacent ones of the plurality of square wave signals is 2, and the two or more basic unit signals meet the following requirement: if a lowest frequency of dominant frequencies in a first basic unit signal is denoted as a fundamental frequency, lowest frequencies of the remaining basic unit signals are $l\times2^m$ times the fundamental frequency, where l is an odd number except 1, and m is a natural number; and
 superposing the two or more basic unit signals to obtain a logarithmic non-uniform $2^n$ sequence pseudo-random signal.

Embodiment V

An objective of this embodiment is to provide an electrical exploration signal transmitter, configured to obtain a logarithmic non-uniform $2^n$ sequence pseudo-random signal meeting an exploration requirement by using the method for generating a logarithmic non-uniform pseudo-random electromagnetic exploration signal according to an embodiment.

The above descriptions are merely preferred embodiments of the present invention and are not intended to limit the present invention. Those skilled in the art may make various modifications and changes to the present invention. Any modification, equivalent replacement, or improvement made within the spirit and principle of the present invention shall fall within the protection scope of the present invention.

The above descriptions are merely preferred embodiments of the present invention and are not intended to limit the present invention. Those skilled in the art may make various modifications and changes to the present invention. Any modification, equivalent replacement, or improvement made within the spirit and principle of the present invention shall fall within the protection scope of the present invention.

What is claimed is:

1. A method for generating a logarithmic non-uniform pseudo-random electromagnetic exploration signal, the method comprising:
 constructing two or more basic unit signals according to an exploration requirement, wherein
 the basic unit signals are stairstep signals obtained by superposing a plurality of in-phase periodic square wave signals, a frequency ratio between adjacent ones of the plurality of periodic square wave signals is 2, and the two or more basic unit signals meet the following requirements: if a lowest frequency of dominant frequencies in a first basic unit signal is denoted as a fundamental frequency, lowest frequencies of the remaining basic unit signal are l×2$^m$ times the fundamental frequency, and the lowest frequencies of the basic unit signals differ from each other, wherein l is an odd number except 1, and m is a natural number; and superposing the two or more basic unit signals to obtain superposed stairstep signals, and correcting amplitudes to be consistent with amplitudes of the periodic square wave signals, to obtain a logarithmic non-uniform $2^n$ sequence pseudo-random signal;

wherein, the logarithmic non-uniform $2^n$ sequence pseudo-random signal comprises different frequency densities in different frequency intervals, by adjusting highest and lowest frequencies of the basic unit signals and controlling of a multiple between the lowest frequencies of dominant frequencies in the basic unit signals to be l×2$^m$;

performing a geophysical field exploration by using the logarithmic non-uniform $2^n$ sequence pseudo-random signal, continuously receiving electromagnetic information and field data focused in frequency intervals of interest to prospectors by receivers in a rolling manner; wherein, the logarithmic non-uniform $2^n$ sequence pseudo-random signal is able to be simultaneously transmitted and received at dozens of frequencies; and determining at least one physical characteristic of an underground subject to the geophysical field exploration by analyzing the logarithmic non-uniform $2^n$ sequence pseudo-random signal.

2. The method for generating a logarithmic non-uniform pseudo-random electromagnetic exploration signal according to claim 1, wherein the two or more basic unit signals meet the following requirements:

a sum of quantities of dominant frequencies of all of the basic unit signals is an odd number; and a quantity of the dominant frequencies of the first basic unit signal is greater than those of other basic unit signals, lowest frequencies and highest frequencies of the other basic unit signals fall within a frequency interval between a lowest frequency and a highest frequency of the first basic unit signal, and the basic unit signals have no repeated frequencies.

3. The method for generating a logarithmic non-uniform pseudo-random electromagnetic exploration signal according to claim 1, wherein a method for generating the periodic square wave signal comprises:

generating sinusoidal signals having the same frequency as a target periodic square wave, and setting values of the sinusoidal signals that are greater than 0 to A and values of the sinusoidal signals that are less than 0 to −A, to obtain a series of in-phase periodic square wave signals, wherein A≠0; and assigning A or −A to positions of periodic square wave signals having a value of 0 to obtain periodic square wave signals having no value of 0.

4. The method for generating a logarithmic non-uniform pseudo-random electromagnetic exploration signal according to claim 3, wherein the step of assigning A or −A to positions of the periodic square wave signals having a value of 0 specifically comprises:

identifying positions of the periodic square wave signals having a value of 0 by using an index, setting odd positions to A, and setting even positions to −A.

5. The method for generating a logarithmic non-uniform pseudo-random electromagnetic exploration signal according to claim 1, the method further comprising:

performing a phase adjustment on at least one of the two or more basic unit signals, and finding, as an optimal phase of the corresponding basic unit signal, a phase that minimizes a relative mean square (RMS) error of spectrum values corresponding to dominant frequencies in a superposed logarithmic non-uniform $2^n$ sequence pseudo-random signal; and superposing the two or more basic unit signals according to the optimal phase to obtain a final logarithmic non-uniform $2^n$ sequence pseudo-random signal.

6. The method for generating a logarithmic non-uniform pseudo-random electromagnetic exploration signal according to claim 5, wherein a method for finding the optimal phase comprises:

for the basic unit signals on which the phase adjustment is performed, dividing a phase radian π in half a period into N parts, to obtain phase-changed basic unit signal π/N;

adjusting one phase-changed basic unit signal each time, and recording the RMS error of spectrum values corresponding to dominant frequencies in the superposed logarithmic non-uniform $2^n$ sequence pseudo-random signal; and drawing a variation curve of the RMS error with a phase, and finding a phase, as the optimal phase of the basic unit signal, that minimizes the RMS error.

7. An electromagnetic exploration system, comprising an electrical exploration signal transmitter, a terminal device, and a plurality of receivers; wherein, the electrical exploration signal transmitter, being configured to transmit a logarithmic non-uniform $2^n$ sequence pseudo-random signal generated by using a method for generating a logarithmic non-uniform pseudo-random electromagnetic exploration signal to a filed; wherein, the logarithmic non-uniform $2^n$ sequence pseudo-random signal is able to be simultaneously transmitted and received at dozens of frequencies;

the plurality of receivers, being configured to continuously receive the logarithmic non-uniform $2^n$ sequence pseudo-random signal with field data on a rolling manner; and the terminal device, comprising a processor and a non-transitory computer-readable storage medium, wherein, the non-transitory computer-readable storage medium is configured to store a plurality of instructions, wherein the instructions are adapted to be loaded by the processor to perform the method for generating the logarithmic non-uniform pseudo-random electromagnetic exploration signal; and when the processor implements the instructions, executing:

construct two or more basic unit signals according to a geophysical field exploration requirement, wherein the basic unit signals are stairstep signals obtained by superposing a plurality of in-phase periodic square wave signals, a frequency ratio between adjacent ones of the plurality of periodic square wave signals is 2, and the two or more basic unit signals meet the following requirement: if a lowest frequency of dominant frequencies in a first basic unit signal is denoted as a fundamental frequency, lowest frequencies of the remaining basic unit signal are l×2$^m$ times the fundamental frequency, wherein l is an odd number except 1, and m is a natural number;

obtain the logarithmic non-uniform $2^n$ sequence pseudo-random signal by superposing the two or more basic unit signals; and determine at least one physical characteristic of an underground subject to the geophysical field exploration by analyzing the logarithmic non-uniform $2^n$ sequence pseudo-random signal.

8. The electromagnetic exploration system according to claim 7, wherein the two or more basic unit signals meet the following requirements:

a sum of quantities of dominant frequencies of all of the basic unit signals is an odd number; and a quantity of the dominant frequencies of the first basic unit signal is greater than those of other basic unit signals, lowest frequencies and highest frequencies of the other basic unit signals fall within a frequency interval between a lowest frequency and a highest frequency of the first basic unit signal, and the basic unit signals have no repeated frequencies.

9. The electromagnetic exploration system according to claim 7, wherein a method for generating the periodic square wave signal comprises:

generating sinusoidal signals having the same frequency as a target periodic square wave, and setting values of the sinusoidal signals that are greater than 0 to A and values of the sinusoidal signals that are less than 0 to −A, to obtain a series of in-phase periodic square wave signals, wherein A≠0; and assigning A or −A to positions of periodic square wave signals having a value of 0 to obtain periodic square wave signals having no value of 0.

10. The electromagnetic exploration system according to claim 9, wherein the step of assigning A or −A to positions of the periodic square wave signals having a value of 0 specifically comprises:

identifying positions of the periodic square wave signals having a value of 0 by using an index, setting odd positions to A, and setting even positions to −A.

11. The electromagnetic exploration system according to claim 7, further comprising:

performing a phase adjustment on at least one of the two or more basic unit signals, and finding, as an optimal phase of the corresponding basic unit signal, a phase that minimizes a relative mean square (RMS) error of spectrum values corresponding to dominant frequencies in a superposed logarithmic non-uniform $2^n$ sequence pseudo-random signal; and superposing the two or more basic unit signals according to the optimal phase to obtain a final logarithmic non-uniform $2^n$ sequence pseudo-random signal.

12. The electromagnetic exploration system according to claim 11, wherein a method for finding the optimal phase comprises:

for the basic unit signals on which the phase adjustment is performed, dividing a phase radian π in half a period into N parts, to obtain phase-changed basic unit signal π/N;

adjusting one phase-changed basic unit signal each time, and recording the RMS error of spectrum values corresponding to dominant frequencies in the superposed logarithmic non-uniform $2^n$ sequence pseudo-random signal; and drawing a variation curve of the RMS error with a phase, and finding a phase, as the optimal phase of the basic unit signal, that minimizes the RMS error.

* * * * *